United States Patent Office 3,548,430
Patented Dec. 22, 1970

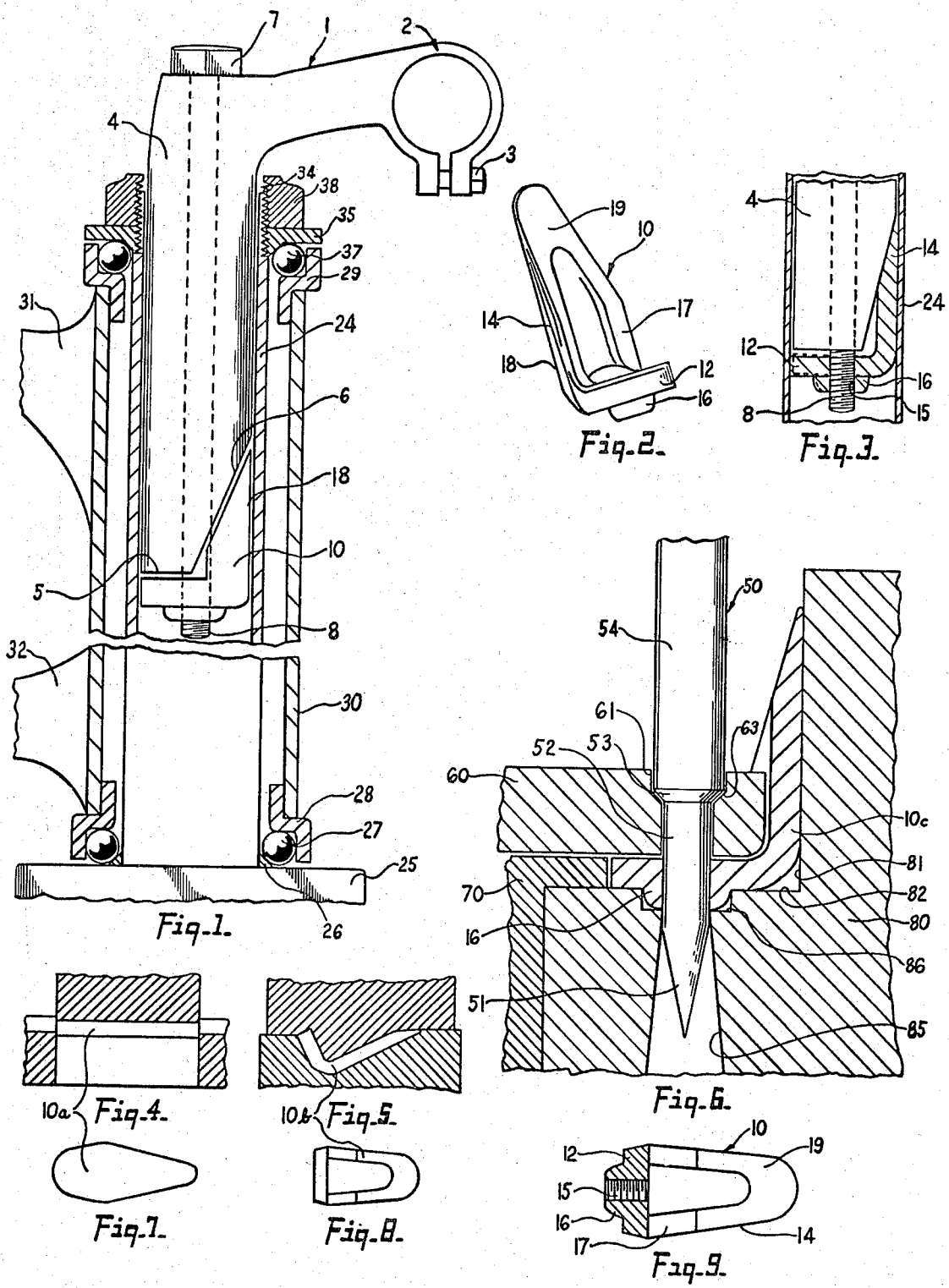

3,548,430
WEDGE NUT
Richard C. Reinker, Ashtabula, Ohio, assignor to The Ashtabula Bow Socket Company, Ashtabula, Ohio, a corporation of Ohio
Original application Dec. 15, 1966, Ser. No. 601,994. Divided and this application Aug. 2, 1968, Ser. No. 760,380
Int. Cl. B21d 53/00, 53/24
U.S. Cl. 10—86                    1 Claim

ABSTRACT OF THE DISCLOSURE

This disclosure relates to steel wedge nuts for cycle steering stems. The wedge nuts are stamped into a shape having a base or nut portion and an upstanding wedge portion. The base portion is pierced in a manner which provides an extruded hole and the extruded hole is tapped throughout its length for threaded engagement with the stem bolt in the fork tube. The cold working of the steel during forging of the wedge nut and piercing and extruding of the hole provides, for a given thickness of material, both longer and stronger internal threads and prevents movement of the nut portion relative to the wedge portion when force is applied to the stem bolt.

---

This is a division of application Ser. No. 601,994, filed Dec. 15, 1966, now abandoned.

The invention more particularly is a stamped wedge nut for securing a handle bar stem within a fork tube on a bicycle having a hollow stem with the stem bolt extending therethrough with the outer end of the stem having a ring for clamping and holding a handle bar intermediate the ends thereof. The hollow portion of the stem projects into the fork tube and the wedge nut moves radially outwardly in a manner which will grip the inside of the fork tube to move the fork and front wheel mounted therein in direct response to movement of the handle bars.

The fork tube fits within the front tube of the frame which has, at respective ends thereof, ball cups with ball bearings moving therein. The balls move between the lower ball cup and a lower stationary fork cone mounted adjacent the bifurcated portion annularly around the fork tube, and between the upper ball cup and an upper fork cone which is threadedly engaged on an upper threaded portion of the fork tube and held securely in place by an upper fork cone lock nut to prevent inadvertent disassembly of the cycle steering assembly.

The prior art has included wedge nuts for engagement with an inclined surface on the end of the cycle steering stem when drawn up by the stem bolt. These wedge nuts have previously been of cast construction or of stamped metal construction. The primary problem in the prior art however has been providing sufficient length and strength of threads in the nut portion of the wedge nut to withstand the necessary tension and force applied to the stem bolt to create movement of the wedge nut along the inclined surface on the bottom of the cycle steering stem in a radial direction to grip internally the fork tube and hold the handle bar stem rigid with the fork and wheel mounted therein for positive response steering of the bicycle.

The wedge nut according to the present invention has been provided of a mild steel which, because of the forging of the general shape of the wedge nut and the provision of a piercing and a hole extruding step subsequent to the forging, cold works the wedge nut such that threads tapped therein are both longer and stronger than heretofore have been economically feasible to be provided in cycle stem wedge nuts.

By extruded hole is meant a hole formed by a punch or piercing tool which first cleanly cuts a hole and then is pushed farther through to form a projecting flange with an enlargement of the original hole.

Accordingly, it is an object of this invention to provide an improved cycle stem wedge nut having an extruded hole.

More specifically, it is an object of this invention to provide a cycle stem wedge nut which has an extruded hole to provide a greater length of thread tapped in steel which has been cold worked to provide greater strength thereby to prevent stripping of the threads during tightening of the cycle stem to the fork and front wheel assembly for responsive steering.

Other and more specific objects of the invention will become apparent from description to follow.

FIG. 1 is a fragmentary cross sectional elevational view showing the cycle stem and fork tube assembly with the wedge nut in assembled position on the end of the stem within the fork tube.

FIG. 2 illustrates a perspective view of the wedge nut constructed according to the principles of this invention.

FIG. 3 is a fragmentary cross sectional elevation view of the wedge nut of this invention with the position of maximum threading before failure dotted in for illustration.

FIG. 4 is a schematic cross sectional view of the blank shearing operation for making the wedge nut according to the principles of this invention.

FIG. 5 is a schematic cross sectional elevational view of the forging operation for making the wedge nut of this invention.

FIG. 6 is a schematic cross sectional elevational view of the piercing and hole extruding step of making the wedge nut according to the principles of this invention with a stripping plate shown in position.

FIG. 7 is a plan view of the sheared blank made according to the principles of the invention.

FIG. 8 is a plan view of a forged blank made according to the principles of the invention.

FIG. 9 is a cross sectional view of the pierced and extruded blank made according to the principles of the invention with the further step of tapping having been performed.

In FIG. 1, numeral 1 generally designates the cycle steering stem which has handle bar clamping portion 2 with clamping nut 3 in association therewith and a central hollow leg portion 4 with an end 5 and an adjacent tapered surface portion 6. A stem bolt 7 extends through the hollow stem leg 4 and has a projecting threaded portion 8 upon which a wedge nut 10 constructed according to the principles of the invention is threadedly engaged.

As seen in FIG. 2, the wedge nut 10 has a base or nut portion 12 and an upstanding wedge portion 14. A tapped extruded hole 15 is provided with the outer portion thereof extruded into a projection 16 to provide cold working of the base portion and greater thread length. The upstanding wedge portion 14 has upstanding surface 17, an outer arcuate surface 18, and tapered portion 19 to ride along surface 6 in association therewith such that the outer arcuate surface 18 grippingly engages the inner cylindrical surface of a fork tube 24 as the bolt 7 is turned.

The fork tube 24 extends upwardly from the bifurcated portion 25 of the fork such that the fork tube is telescopically received within the front frame tube 30 of a bicycle frame which includes bars 31 and 32. The fork tube at the location of its joinder to the bifurcated portion 25 of the fork has a lower stationary fork cone 26 upon which ball bearings 27 ride as they are held in place by lower ball cups 28 between the fork tube 24 and the frame tube 30. At the upper end of the frame tube 30 is an upper ball cup 29. On the upper end of the fork tube 24 and adjacent the end thereof is a threaded portion 34 which has an annular upper fork cone 35 threadedly engaged therewith to maintain upper ball bearings 37 in an assembled relation between the fork tube 24 and the frame tube 30. An upper fork cone lock nut 38 is threadedly engaged with the threads 34 to lock the telescoped assembly in firm engagement and insure that the frame and the frame tube 24 and the fork tube 30 maintain an integral structure permitting relative rotational movement to permit steering in response to movement of the handle bars through stem 1.

In FIG. 3 the wedge nut 10 is illustrated as having two positions, a second position shown by dotted lines for the base 12 is a position of maximum deflection just prior to failure of the wedge nut or stem bolt and illustrates the types of forces that are involved which tend to strip the threads of the wedge nut hole or break the projecting threaded end 8 of the stem bolt 7. Both kinds of failures are minimized in the present device in which the extruded hole 15 is provided.

FIG. 4 illustrates the step of shearing a blank into the shape of the blank 10a as seen in FIG. 7. A common carbon steel such as A.I.S.I. 1038 may be utilized in that it gives a good and inexpensive material to work with which will take the significant cold working.

FIG. 5 shows the rather drastic cold forging operation which puts the blank 10a of FIG. 7 into a blank having the shape 10b as illustrated in FIG. 8.

FIG. 6 is a view of the just completed hole piercing and extruding operation as performed on the blank 10b of FIG. 8. A piercing tool 50 is provided with an end portion 51 tapering to a point from an intermediate cylindrical extruding portion 52 which is separated by shoulder 53 from an enlarged diameter shank portion 54. The shank portion 54 receives the force and moves down through an opening 61 in stripper plate 60 which is shaped to receive the tool 50 until the shoulder 53 comes to rest on the complementary shoulder 63 of the stripper plate.

A suitable jig 70 holds the blank 10b in place during piercing and extruding of the hole. As the pointed portion 51 of the piercing tool 50 enters the blank 10b, the blank 10b rests on a die 80 with a horizontal surface 82 and a reference plane 81 normal thereto against which the surface 18 of the upstanding wedge portion of the blank 10b is held. An opening 85 just barely provides clearance for the extrusion portion 52 of the tool 50 after the sharp portion 51 of the piercing tool 50 has passed through the blank.

As the extruding surface portion 52 of tool 50 enters the hole in the blank 10b created by the sharp pointed portion 51 of the piercing and extruding tool, it extrudes the portion 16 of the blank down into an annular cavity 86 in surface 82 which is concentric with the opening 85 but which is spaced from the die surface 82 by the amount of hole length to be added to the wedge nut by the hole extrusion process. Because of the volume of the annular area defined at 86 and because of the tight fit of the opening 85 with the extruding portion 52 of the piercing tool a hole projection 16 is provided with a cold worked surface. Thus, after being stripped from the tool by the stripper plate 60 a cold worked elongated hole 15 is provided which may be tapped as shown in FIG. 9 to provide the improved cycle steering wedge nut of the invention.

For ease of description the principles of the invention have been set forth in connection with but a single illustrated embodiment. It is not my intention that the illustrated embodiment, nor the terminology applied in describing it be limiting inasmuch as variations can be made without departing from the spirit of the invention. Rather, I desire to be restricted only by the scope of the appended claim.

The invention claimed is:

1. The method of making a wedge nut from work hardenable steel for cycle steering stems comprising the steps of, severing a blank from flat stock, forging said blank into a wedge nut having a base portion and a wedge portion projecting normally therefrom, placing said forged nut in a die with said base portion overlying the die opening and said wedge portion lying flat against an upstanding side of said die, positioning a stripper plate over said base portion and said die opening, aligning a piercing hole in said plate with said die opening, clamping said forged nut between the die and the plate, piercing said base portion with a tapered piercing tool by forcing said tool through the aligned stripper plate hole and the die opening, extruding said base portion around said hole to produce a boss projecting therefrom while simultaneously locally work hardening the metal defining the hole, removing the piercing tool and the nut from the die, and tapping said hole throughout its length with a tap of a diameter substantially equal to or less than the axial length of the hole.

References Cited

UNITED STATES PATENTS

| | | | |
|---|---|---|---|
| 1,369,353 | 2/1921 | Rabe | 83—30 |
| 2,157,354 | 5/1939 | Sherman | 10—86 |
| 2,552,109 | 5/1951 | Nahman | 29—609 |
| 1,309,616 | 7/1919 | Eisler | 85—32 |
| 2,058,064 | 10/1936 | Culbertson | 85—32 |
| 2,769,990 | 11/1956 | Pawsat | 85—32 |
| 3,425,312 | 2/1969 | McCauley | 85—32 |

CHARLES W. LANHAM, Primary Examiner

E. M. COMBS, Assistant Examiner

U.S. Cl. X.R.

85—32, 79